United States Patent [19]

Jonner et al.

[11] Patent Number: 4,900,102
[45] Date of Patent: Feb. 13, 1990

[54] ANTI-SKID AND TRACTION CONTROL SYSTEM

[75] Inventors: Wolf-Dieter Jonner, Beilstein-Schmidhausen; Lothar Kirstein, Ditzingen, both of Fed. Rep. of Germany

[73] Assignee: Robert Bosch GmbH, Stuttgart, Fed. Rep. of Germany

[21] Appl. No.: 330,322

[22] Filed: Mar. 29, 1989

[30] Foreign Application Priority Data

May 11, 1988 [DE] Fed. Rep. of Germany ....... 3816073

[51] Int. Cl.⁴ .......................... B60T 8/32; B60T 8/34; B60T 8/44; B60T 13/16
[52] U.S. Cl. .................................... 303/110; 303/116; 303/119
[58] Field of Search .............. 303/110, 116, 119, 100, 303/10–12, 114, 113, 91, 92; 188/181 AH; 180/197, 233, 244–248

[56] References Cited

U.S. PATENT DOCUMENTS

| | | | |
|---|---|---|---|
| 4,804,236 | 2/1989 | Burgdorf et al. | |
| 4,805,965 | 2/1989 | Jonner et al. | 303/100 |
| 4,818,038 | 4/1989 | Ocvirk et al. | 303/110 X |
| 4,818,039 | 4/1989 | Bertting et al. | 303/110 X |
| 4,824,186 | 4/1989 | Leiber et al. | 303/110 |
| 4,836,617 | 6/1989 | Resch | 180/197 X |
| 4,838,620 | 6/1989 | Sypniewski | 303/116 |
| 4,840,436 | 6/1989 | Burgdorf et al. | 303/119 |

Primary Examiner—Douglas C. Butler
Attorney, Agent, or Firm—Edwin E. Greigg

[57] ABSTRACT

A traction control system adapted to an anti-skid control system including a third valve assembly disposed between a pressure fluid container and a first valve assembly, a line is established to an inlet of a pump which in the traction control situation pumps a quantity of pressure fluid at a certain pressure into a line, closed off by a second valve assembly, between the first valve assemblies and the second valve assembly.

30 Claims, 8 Drawing Sheets

ANTI-SKID AND TRACTION CONTROL SYSTEM

BACKGROUND OF THE INVENTION

The invention relates to an anti-skid and traction control system as defined hereinafter. An anti-skid and traction control system of this kind is known (German Offenlegungsschrift No. 36 27 809). In this known anti-skid and traction control system, for traction control at driven wheels of a vehicle, a pump draws a predetermined quantity of pressure fluid from a pressure fluid container. The valve element, with lines leading to the valve element, effects a high throttling resistance. As a result, it is not always assured that a quantity of pressure fluid will be made available fast enough. Another disadvantage is that an additional shutoff valve is necessary in a return line from the pump outlet to the pressure fluid container.

OBJECT AND SUMMARY OF THE INVENTION

The anti-skid and traction control system as defined has an advantage over the prior art that its design is simple, it has fewer individual components and that in the case of traction control, there is no throttling of the pressure fluid between the pressure fluid container and the pump.

Another advantage is that a second valve assembly controls a return line to a pressure fluid container. The return line leads through a multi-circuit master cylinder to the pressure fluid container so that a second pressure-controlled valve can be dispensed with. The pump is embodied with two pump elements which makes for an advantageous high volumetric efficiency.

The disposition of the additional pump has the further advantage that a high volumetric efficiency of the system is attained.

Calming of a quantity of pressure fluid flowing back to the pressure fluid container is assured by an intermediate container, disposed in the return line to the pressure fluid container, and by a second pressure-controlled valve.

The control line branching off from the brake line and leading to a third valve assembly has the advantage of dispensing with an additional valve.

The aspiration process of the pump is intended to occur advantageously via short line segments, to avoid throttle losses.

By being embodied in two pump elements, the pump gains a high volumetric efficiency for the system, and if two such pumps are provided the efficiency is increased still further.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
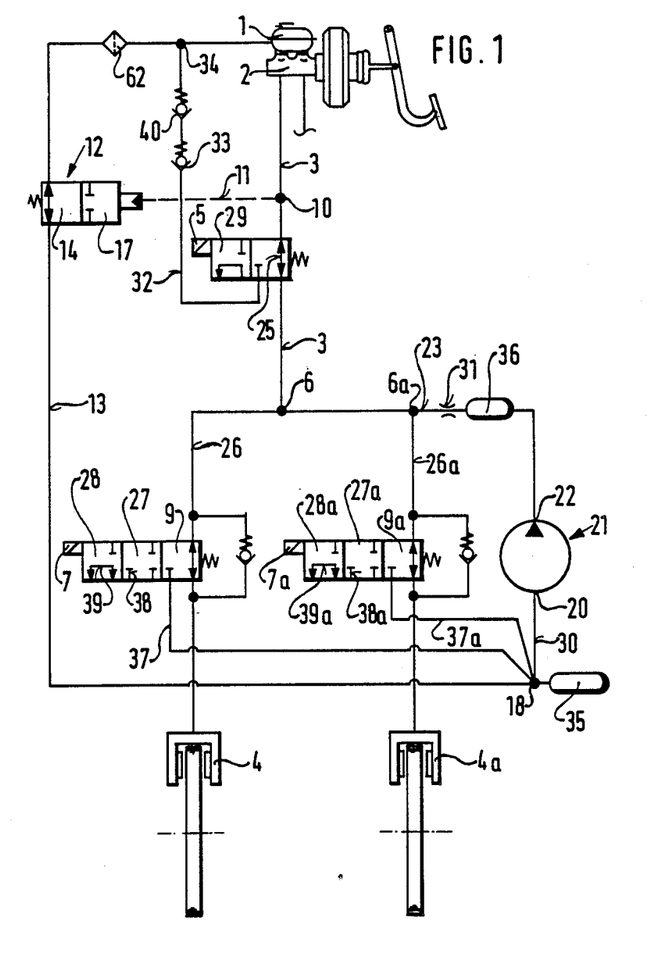
FIGS. 1-11 each show a different exemplary embodiment of an anti-skid and traction control system according to the invention.

An anti-skid and traction control system for vehicles, as shown in FIG. 1, has a pressure fluid container 1 for brake fluid and a multi-circuit master brake cylinder 2 of a known design. A brake line 3 begins at at least one brake circuit chamber of this cylinder 2, and leads to at least one anti-skid- and traction-controlled wheel brake cylinder 4, 4a.

From the multi-circuit master brake cylinder 2, the brake line 3 leads to an electromagnetically actuatable second valve assembly 5, and from there, via feed points 6, 6a, to a respective electromagnetically actuatable first valve assembly 7, 7a, each of which, in an open position, establishes a brake fluid connection with at least one wheel brake cylinder 4, 4a for a respective wheel. The first valve assembly may be embodied by one 3/3-way valve, as shown, or by two 2/2-way valves of known design. The second valve assembly 5 is embodied as a 3/2-way magnetic valve.

Between the multi-circuit master brake cylinder 2 and the second valve assembly 5, a connection point 10 is provided in the brake line 3, from which point a control line 11 extends to an adjusting device for a pressure-controlled third valve assembly 12. This valve assembly is disposed in a line segment 13 located between the pressure fluid container 1 and the valve assemblies 7, 7a; it has an open position 14 and can be switched into a closing position 17 by a predetermined hydraulic pressure operating on the adjusting device for the third valve assembly 12. Beginning at the third valve assembly 12 and looking in the direction of the first valve assemblies 7, 7a, the line segment 13 has a feed point 18, from whence line segments 37, and 37a of the line segment 13 lead to the first valve assemblies 7, 7a. The feed point 18 also communicates with a first receiving chamber 35. At the same time, an inlet side 20 of a pump 21 communicates with the feed point 18 via a line segment 30. The pump 21 could also have a plurality of pump elements hydraulically connected in series, and could be provided with a plurality of inlets embodying the inlet side. Via the line segments 37, 37a connected to the feed point 18, at least one of the wheel brake cylinders 4, 4a can be connected to the inlet side 20 of the self-priming pump 21. From one outlet 22 of the self-priming pump 21, a line 23 connects with a second receiving chamber 36 and a line restriction 31 which leads to the feed points 6, 6a, which in the anti-skid control situation are made to communicate first with the multi-circuit master cylinder 2, via the brake line 3 and an open position 25 of the second valve assembly 5, and second with the first valve assemblies 7, 7a, via a respective line segment 26, 26a; these valve assemblies 7, 7a have respective pressure maintenance positions 27, 27a and pressure reduction positions 28, 28a, respectively.

If traction control should become necessary at a wheel brake cylinder 4, 4a associated with at least one wheel, the third valve assembly 12 remains in the open position 14, and the inlet side 20 of the pump 21 is connected via the line segment 30 and the ensuing line segment 13 to a predetermined pressure fluid volume in the pressure fluid container 1, while the outlet 22 of the pump 21, is connected with the line 23 and via the feed points 6, 6a and at least one of the first valve assemblies 7, 7a to one of the wheel brake cylinders 4, 4a and via the feed point 6 to the second valve assembly 5, which has been put into a switching position 29. In the switching position 29 assumed by the second valve assembly 5, a return line 32 leading away from the second valve assembly 5 is made to communicate with the pump 21 via a portion of the brake line 3, the feed point 6, line 23 and outlet 22. A first pressure-controlled one-way valve 33 is disposed in the return line 32 and remains tightly closed during the pressure buildup of the traction control process; it does not open toward the pressure fluid container 1 until a greatly increased hydraulic operating pressure arises during the traction control process. Downstream of the first pressure-controlled one-way valve 33, there is a second pressure-controlled one-way valve 40, which has a substantially lower opening pressure than the first valve 33. The return line 32 connects the second pressure-controlled valve 40, via a feed point 34, with the line segment 13 leading to the pressure fluid container 1 and to the third valve assembly 12. A filter 62 is connected in the line 13 between the feed point 34 and the third valve assembly 12.

Figure 2:
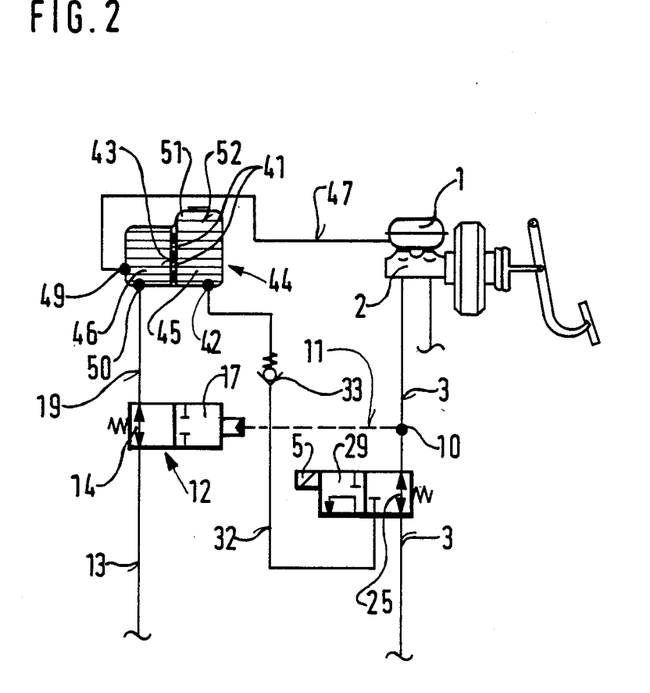

In the exemplary embodiment of FIG. 2, the same reference numerals as in FIG. 1 are used for elements that are the same as and function like those of the first embodiment shown in FIG. 1. For the sake of simplification, the part of the exemplary embodiment of FIG. 2 that is identical to that of FIG. 1, that is, the part adjoining where the lines 3, 13 are cut, following the second valve assembly 5 and the third valve assembly 12, is not shown again in FIG. 2.

In FIG. 2, at least one chamber 45 in an intermediate container 44 is disposed in the return line 32 downstream of the first pressure-controlled valve 33; this chamber 45 is hydraulically connected to a second chamber 46 of the intermediate container 44 by means of a partition 43 having flow openings 41. Through an inlet fitting 42 of the intermediate container 44, a predetermined quantity of pressure fluid from the first pressure-controlled valve 33, which is open, can enter the first chamber 45. A space 51 in the first chamber 45 that is free of pressure fluid will receive a certain quantity of pressure fluid and will permit air bubbles to escape from the returning pressure fluid.

Via the flow openings 41 made in the partition 43, an overflow of the pressure fluid from the first chamber 45 into the second chamber 46, and from there through a first fitting 49 in the direction of the pressure fluid container 1 via line 47, is possible.

A second fitting 50 on the second chamber 46 is located at a line segment 19 to the third valve assembly 12, by which the fitting 50 can be connected to and disconnected from the inlet side of the pump by the third valve assembly 12.

Figure 3:
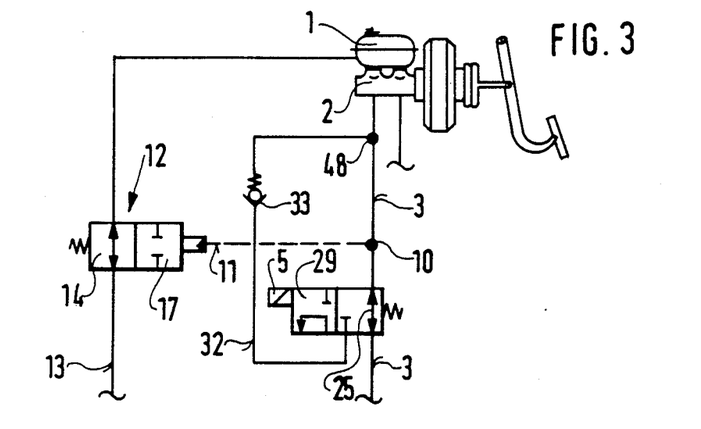

In the exemplary embodiment of FIG. 3, in which the same reference numerals are used for identical and identically functioning elements as in the previous embodiments of FIGS. 1 and 2, and of which once again only a part corresponding to FIG. 2 is shown, the return line 32 downstream of the first pressure-controlled valve 33 is connected to a feed point 48 to the brake line 3 between the second valve assembly 5 and the multi-circuit master cylinder 2.

Through the multi-circuit master cylinder 2, a certain quantity of pressure fluid can be returned to the pressure fluid container 1 that communicates hydraulically with the multi-circuit master cylinder 2.

In the exemplary embodiment of FIG. 4, in which once again the same reference numerals are used for elements identical to and functioning like those of the embodiments of. FIGS. 1, 2 and 3, FIG. 4 is the same as FIG. 1 except the self-priming pump 21 is provided with a first pump element 53 and a second pump element 54 and the connection of the return line 13 connects to the pump instead of to first pressure container 35.

Figure 4:
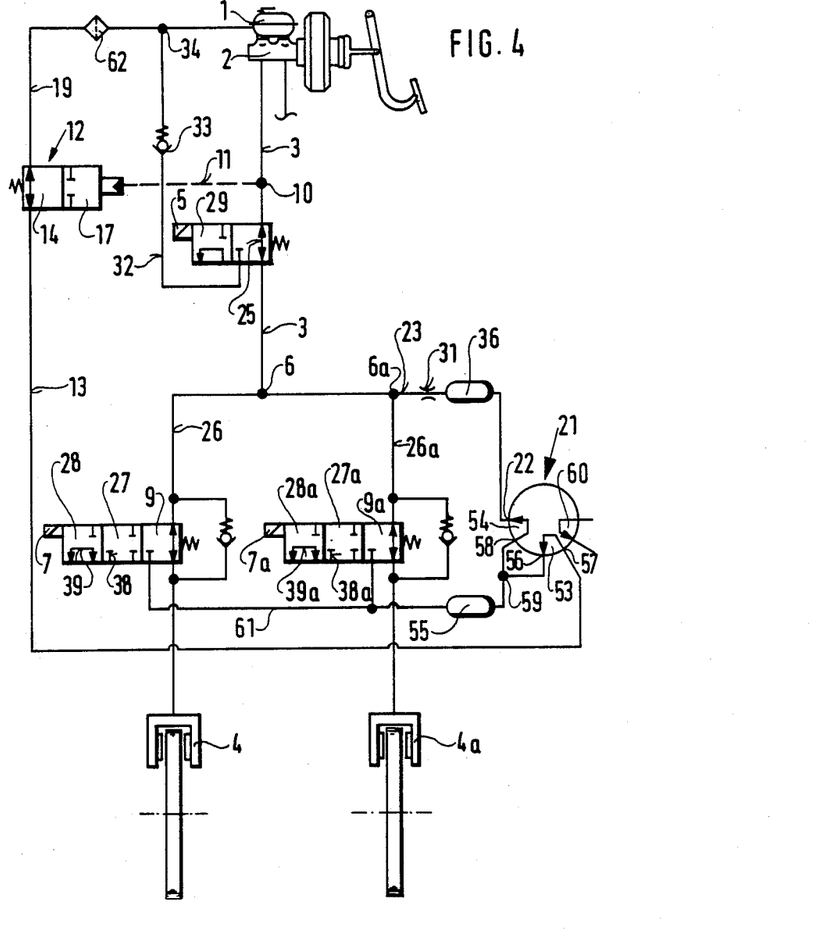

The inlet side of the pump 21 is embodied by a first inlet 57, associated with the first pump element 53, and a second inlet 58, associated with the second pump element 54. The first inlet 57 associated with the first pump element 53 is connected to the line segment 13 communicating with the third valve assembly 12. Between an outlet 56 of the first pump element 53 and the downstream second inlet 58 of the second pump element 54, there is a feed point 59 to which a third receiving chamber 55 is connected in the direction of a line segment 61 leading to the first valve assemblies 7, 7a.

To enable the provision of an additional brake circuit for the anti-skid and traction control system, the pump 21 can be equipped with further pump elements, which can function singly, like a third pump element 60 shown, or together, like the two pump elements 53, 54.

A filter 62 is disposed in a line segment 19 between the pressure fluid container 1 and the third valve assembly 12 such that if needed for the traction control situation, a pressure fluid flowing downstream in the return line 32 can flow via the filter 62 to the third valve assembly 12 and to the inlet side of the pump 21. The filter 62 is also shown in the system of FIG. 1.

In the exemplary embodiment of FIG. 5, again shown only in part as before and in which the same reference numerals again identify elements identical to and functioning like those of the previous embodiments, a further feed point 64 is disposed in the brake line 3 between the second valve assembly 5 and the first valve assemblies, and from which the return line 32 leads downstream of the first pressure-controlled valve 33 to the feed point 48 at the brake line 3 between the second valve assembly 5 and the multi-circuit master cylinder 2. The second valve assembly 5 is embodied as a 2/2-way magnetic valve, having an open position 25 and a closing position 87.

In the exemplary embodiment of FIG. 6, in which once again the same reference numerals identify elements that are the same as and function like those of the previous embodiments, a pressure fluid line 79 extends from a supplementary pressure fluid container 66 to the first inlet 57 of the first pump element 53 and from the outlet 56 of the first pump element 53 through an ensuing fourth valve assembly 65, embodied as a 3/2-way valve, to the second inlet 58 of the second pump element 54. The fourth valve assembly 65 is embodied either as a magnetic valve, or as a pressure-controlled valve as shown by dotted line 68, which is triggered from the brake line 3 via a control line 68. Branching off from a feed point 80 between the supplementary pressure fluid container 66 and the first inlet 57 of the first pump element 53 is a line segment 81 that communicates with the fourth valve assembly 65 and, in the traction control situation, with the outlet 56 of the first pump element 53.

Figure 6:
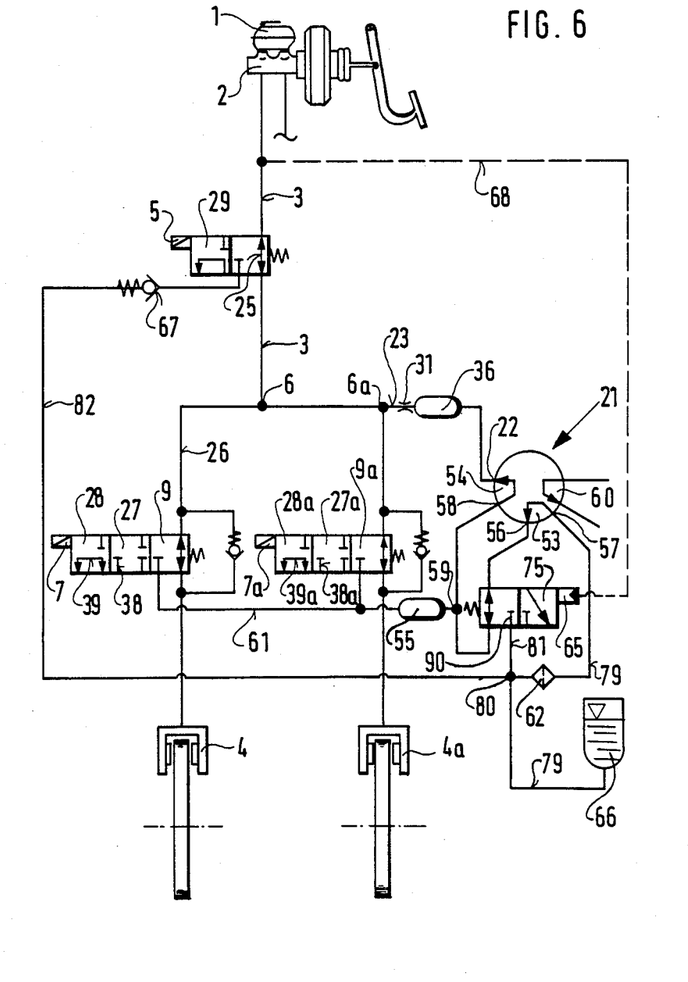

A further line 82 leads from the feed point 80 to a one-way check valve 67 which opens in the direction of the feed point 80 and after that is connected to the second valve assembly 5. Filter 62 is shown on the line segment 79 between the pump inlet 57 and the feed point 80.

Figure 7:
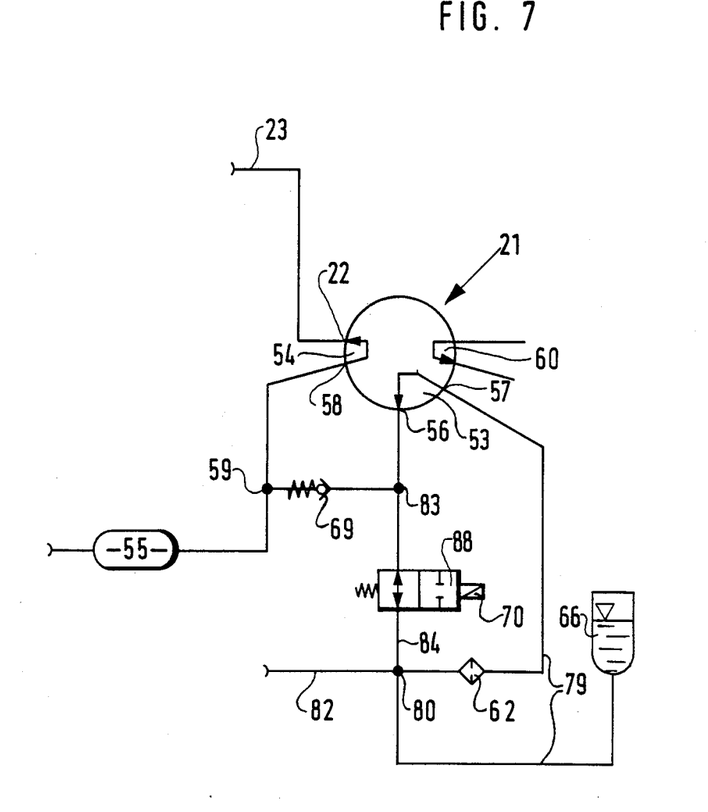

In the exemplary embodiment of FIG. 7, which shows part of the embodiment of FIG. 6, and in which again the same reference numerals are used for identical and identically functioning elements as in the previous embodiments, a one-way check valve 69 that opens in the direction of feed point 59 and the second pump element 54 is provided between the outlet 56 of the first pump element 53 and the inlet 58 of the second pump element 54. From the outlet 56 of the first pump element 53, via a feed point 83 which also communicates with the check valve 69, a line 84 leads through the fourth valve assembly 70 to the feed point 80. The fourth valve assembly 70 is embodied as a 2/2-way magnetic valve.

Figure 8:
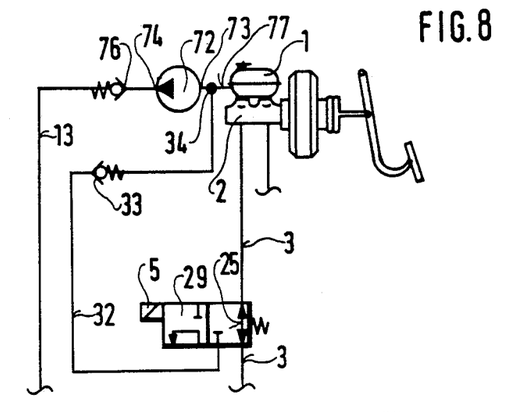

In the exemplary embodiment of FIG. 8, which shows part of the embodiment of FIG. 1 and in which again the same reference numerals identify identical and identically functioning elements as in the previous embodiments, a supplementary feed pump 72 is connected with its inlet 73 and a line segment 77 to the pressure fluid container 1. An outlet 74 of the supplementary feed pump 72 communicates via a one-way check valve 76 with the line system 13, which leads to the inlet side of the pump and to the first valve assemblies, without the interposition of a third valve assembly. The return line 32 leads from the second valve assembly 5 through the first one-way pressure-controlled valve 33 to the feed point 34 into the line segment 77 between the pressure fluid container 1 and the inlet 73 of the supplementary feed pump 72.

Figure 9:
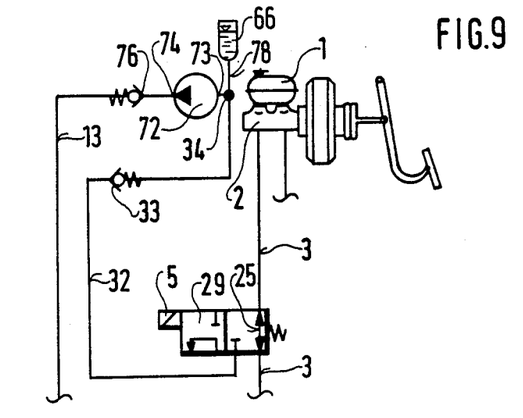

In the exemplary embodiment of FIG. 9, which shows part of FIG. 1, and in which again the same reference numerals identify elements like those of the previous embodiments, the supplementary pressure fluid container 66, unlike the embodiment of FIG. 8, is connected via a line 78 to the inlet 73 of the supplementary feed pump 72, and the communication with the pressure fluid container 1 is omitted.

Figure 10:
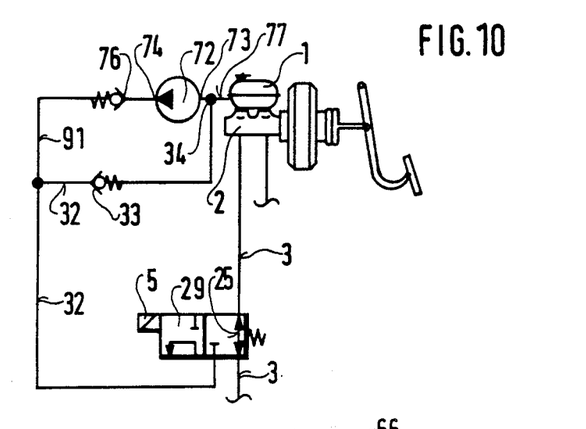

In the exemplary embodiment of FIG. 10, which refers back to FIG. 8 and in which once again the reference numerals are the same for like elements of the previous embodiments, a supply line 91 is connected to the return line 32 between the second valve assembly 5 and the first one-way pressure controlled valve 33 and is prevented from communicating with the outlet 74 of the supplementary feed pump 72 because of the one-way check valve 76 that opens toward the return line 32.

Figure 11:
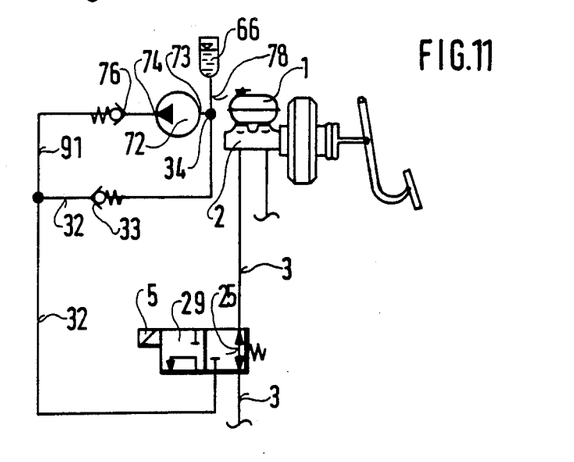

In the exemplary embodiment of FIG. 11, which refers back to FIG. 10 and again has the same reference numerals for like elements of the previous embodiments, the inlet 73 of the supplementary feed pump 72, unlike FIG. 10 but similarly to FIG. 9, communicates via the line 78 with the supplementary pressure fluid container 66, rather than with the pressure fluid container 1.

For all the exemplary embodiments, the manner in which a conventional brake system operates in a brakking operation remains unaffected by either a particular valve assembly or by the disposition of the pump 21 in the overall layout. If a wheel, or several wheels together, are tending to lock, then sensors disposed on the wheels emit signals in a known manner to an electronic control unit, by means of which the first valve assemblies 7, 7a are then electromagnetically triggered and switched into a second position 27, 27a, "pressure maintenance", or a third position 28, 28a, "pressure reduction", resulting in a pressure modulation in the wheel brake cylinders 4, 4a. With the regulation of the valve 7, 7a, the pump 21 is switched on as well, so that the wheel brake cylinders can be relieved of the excess quantity of pressure fluid via the lines 37, 37a. In the case of the wheel brake cylinder 4, during the "pressure maintenance", the first valve assembly 7 switches as needed into the second position 27, and the first valve assembly 7a will remain in the open position 9a. If the pressure in the wheel brake cylinder 4 must subsequently be reduced, then the first valve assembly 7 is switched into the third position 28, and pressure fluid that is now excess is drawn out of the connected lines by the first receiving chamber 35, connected into the line segment 13, and by the pump 21. When the hydraulic pressure prevailing in the brake line 3 is at a value of over approximately 10 bar, the line segment 13 between the first valve assemblies 7, 7a and the pressure fluid container 1 is closed by the pressure-controlled third valve assembly 12. Such a pressure will also arise very quickly in the brake line 3 in the case of anti-skid control occurring on a slick roadway, because a certain amount of pressure fluid is pumped back from the outlet 22 of the pump 21, via the second receiving chamber 36 connected to the line 23, the throttle 31 and the feed points 6, 6a, into the line segments 26, 26a that offer a slight increase in volume and into the brake line 3, and pressure is built up; at the same time, a certain hydraulic pressure from the multi-circuit master cylinder 2 is operative on into the brake line 3 while a vehicle is still slowing down.

In the anti-skid control situation, in the exemplary embodiments of FIGS. 4, 6 and 7, the second pump element 54 of the pump 21 is used by itself to pump excess pressure fluid back out of the wheel brake cylinders 4, 4a. In that case, the communication between the first pump element 53 and the second pump element 54, and hence the connection from the supplementary pressure fluid container 66 to the second pump element 54, is interrupted by the fourth valve assembly 65, 70.

In the exemplary embodiments of FIGS. 8–11, pressure fluid is pumped back from the first valve assemblies 7, 7a to the multi-circuit master cylinder 2 by the pump 21 in a known manner, while in the traction control situation the supplementary feed pump 72 remains out of operation. The second valve assembly 5 assumes its position 25 that opens the brake line 3.

When the vehicle is increasing in speed, if one of the wheels starts to spin that is, if it starts to slip, this is detected in a known manner by a sensor and indicated, by means of a signal of the electronic control unit, to a first valve assembly associated with a driving wheel. The wheel brake cylinders 4, 4a are associated with at least one driving wheel and can be regulated individually or in common for traction control.

The mode of operation in the traction control situation, which is the same for all the exemplary embodiments, will now be described. By means of a controlled switchover process, in the traction control situation the second valve assembly 5 is put into the switching position 29 or 87, FIG. 5, so that in each case the return line 32 communicates with the brake line 3. The simultaneously switched-on pump 21 communicates uninterruptedly, via an inlet 20 or 57, with one of the pressure fluid containers 66, 1; with its output 22, the pump 21 can pump pressure fluid at a predetermined hydraulic pressure into the line 23. If the pump 21 comprises two pump elements 53, 54, then both of them perform pumping. The line segments between one of the pressure fluid containers 1, 66 and one of the inlets 20, 57 of the pump 21 should be kept as short as possible, for the sake of attaining the least possible flow resistance in the suction line of the pump 21.

In the exemplary embodiments of FIGS. 8 and 9, the supplementary feed pump 72 additionally pumps pressure fluid, in the traction control situation, in the direction of the inlet side 20 of the concurrently switched-on pump 21.

From the outlet 22 of the pump 21, pressure fluid is pumped into the brake line 3 between the second valve assembly 5 and the first valve assemblies 7, 7a, and from there can be carried to at least one wheel brake cylinder 4, 4a. During a pressure modulation effected by at least one of the first valve assemblies 7, 7a, if an elevated hydraulic pressure arises in the return line 32 having the first pressure-controlled valve 33, then the first pressure-controlled valve 33 opens in the direction of the pressure fluid container 1 or 66, and keeps the pressure in the return line 32 virtually constant.

In the exemplary embodiments of FIGS. 10 and 11, the supplementary feed pump 72 pumps pressure fluid via the brake line 3 in the direction of the outlet 22 of the pump 21 and at the same time in the direction of the first valve assemblies 7, 7a and into the connected return line 32. The pressure fluid for the traction control process can be drawn one time from the pressure fluid container 1 (FIG. 10) communicating with the multi-circuit master cylinder 2 and another time from the separately disposed supplementary pressure fluid container 66 (FIG. 11).

In a known manner, the first pressure-controlled valve 33 can also be accommodated in he switching position 29 of the second valve assembly 5; the second valve assembly 5 may be embodied as a 2/2-way magnetic valve.

If one brace circuit is associated with only one driving wheel, in a divided brake circuit arrangement, the volume of pressure fluid is switched through one of the first valve assemblies 7, 7a to one of the wheel brake cylinders 4, 4a associated with the driving wheel, while the other of the first valve assemblies 7, 7a is switched into a shutoff position with respect to the other wheel brake cylinder 4, 4a. The pressure modulation in the one first wheel brake cylinder 4, 4a is attainable by means of an electromagnetic triggering of the one first valve assembly 7, 7a into the "pressure maintenance" and "pressure reduction" positions 27, 27a and 28, 28a, respectively. At least one inlet of the switched-on pump 21 communicates with a respective shut-off connection 38, 38a of the respective second position 27, 27a, or a respective open connection 29, 29a of the associated third position 28, 28a of the first valve assembly 7, 7a.

In the case of a quantity of pressure fluid pumped from the outlet 22 of the pump 21 into the brake line 3 and the return line 32, the pressure-controlled first valve 33 will open, at a pressure value of approximately 100 bar, in the direction of the pressure fluid container 1 or 66, and will not allow the pressure in the brake line 3 to increase further.

If the pressure at the first pressure-controlled valve 33 then drops below this value again, the first pressure-controlled valve 33 returns to its outset position and closes the return line 32.

The second pressure-controlled valve 40, disposed downstream of the first pressure-controlled valve 33 in the exemplary embodiment of FIG. 1, opens in the direction of the pressure fluid container 1 at a pressure value of less than 10 bar, thus assuring a graduated reduction of pressure in the return line 32; the returning quantity of pressure fluid is calmed and slowed down thereby.

In the exemplary embodiment of FIG. 2, a certain pressure reduction in the quantity of pressure fluid flowing downstream out of the first pressure-controlled valve 33 into he intermediate container 44 is attained by first directing the pressure fluid through the inlet fitting into the first chamber 45, in which it can quickly spread out into the free space 51. Air bubbles entrained by the pressure fluid can escape to the surface 52 of the pressure fluid in the first chamber 45, which chamber communicates with the atmosphere. Certain openings 41 in the partition 43 assure a slowly evolving flow passage from the first chamber 45 to the second chamber 46 and from there in the direction of the pressure fluid container 1.

In the exemplary embodiment of FIG. 3, the quantity of pressure fluid flowing out of the first pressure-controlled valve 33 in the return line 32 is directed through the multi-circuit cylinder 2 into the pressure fluid container 1; this enables a reduction of pressure to the level of the pressure fluid container 1, and calming and degassing of the returned quantity of pressure fluid can be effected.

In the exemplary embodiment of FIG. 4, the pump 21 is equipped with a first pump element 53 and a second pump element 54. The first pump element 53, acting as a so-called pre-charging pump, cooperates with the second pump element 54, acting as a return pump, in the following manner: Via the line segment 13, which is as short as possible, pressure fluid is aspirated, with little line loss, to the first inlet 57 of the first pump element 53 and is pumped at a pre-pressure into the connection, which is as short as possible, between the outlet 56 of the first pump element 53 and the second inlet 58 of the second pump element 54. A pressure fluid, pumped at pre-pressure by the first element 43, is withdrawn by the second pump element 54 and pumped onward at increased pressure from the outlet 22 of the pump 21 into the line segment 23. The pumps 21 of the exemplary embodiments of FIGS. 6 and 7 function in the same way.

A self-priming pump having two pump elements operating at different pressures is known from German patent No. 26 46 583, so its function and the advantages it offers need not be explained in further detail here. The third receiving chamber 55 serves as a storage means for the pressure medium flowing via the lines connected to it.

Figure 5:
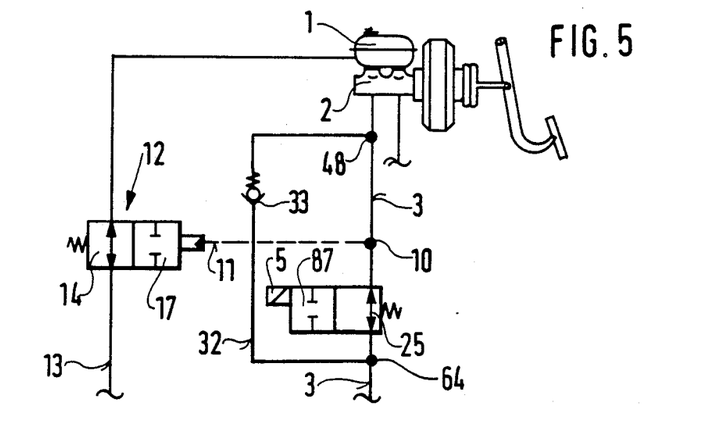

In the exemplary embodiment of FIG. 5, the second valve arrangement 5 is switched into a closing position 87 during the traction control process.

If an elevated pressure value for the pressure fluid in the return line 32 arises, then the first pressure-controlled valve 33 opens in the direction of the multi-circuit master cylinder 2 and does not allow the pressure value to increase further. For the sake of simple functioning, the second valve assembly 5 here is embodied as a 2/2-way magnetic valve.

In the exemplary embodiment of FIG. 6, pressure fluid for the traction control process is aspirated from the supplementary pressure fluid container 66 by the first pump element 53 of the pump 21 and is pumped in the direction of the second pump element 54 of the pump 21 via the fourth valve assembly 65, which is in the position shown.

From the second pump element 54, the pressure fluid is pumped onward at increased pressure into the lines between the second valve assembly 5 and the first valve assemblies 7, 7a. In the traction control situation, the second valve asembly 5 is switched into the switching position 29.

If the pressure in the brake line 3 reaches an elevated pressure of ca. 100 bar, the check valve 67 in the further line 82, acting as a return line, opens in the direction of the supplementary pressure fluid container 66 and first inlet 57 of the first pump element 53 of the pump 21. The fourth valve assembly 65 is triggered via the hydraulic control line 68 in such a manner that at a pressure in the brake line 3 of over about 10 bar, as described above, it is put into a position 75 in which the outlet 56 of the first pump element 53 is made to communicate with the inlet 57 and the supplementary pressure container 66.

In the exemplary embodiment of FIG. 8, in the traction control situation, the switching position 29 of the second valve assembly 5 effects a connection between the return line 32, connected to the brake line 3, and the pressure fluid container 1 whenever the pressure value in the return line 32 reaches approximately 100 bar and the first pressure-controlled valve 33 opens.

In the exemplary embodiment of FIG. 9, in the traction control situation, as just described for the embodiment of FIG. 8, pressure fluid at more than approximately 100 bar flows via the return line 32 into the supplementary pressure fluid container 66 or to the inlet of the supplementary feed pump 72.

In the exemplary embodiments of FIGS. 10 and 11, in the traction control situation, and at a pressure value in the brake line 3 of over approximately 100 bar generated by the pump 21 and the supplementary feed pump 72, the first pressure-controlled valve 33 will open, and pressure fluid will flow back via the return line.

In the case of a divided brake circuit arrangement, if two driving wheels are associated with one brake circuit, a quantity of pressure fluid for the traction control situation can be supplied to at least one of the wheel brake cylinders 4, 4a by at least one of the first valve assemblies 7, 7a, and the first valve assembly 7a, 7 associated with the other wheel brake cylinder 4a, 4 can be switched into a shutoff position.

If the use of two driving wheels in one brake circuit is required, then both wheel brake cylinders 4, 4a can be subjected in common to a certain pressure, or to a pressure that differs from one wheel brake cylinder to the other.

Via a pressure modulation, which can be performed individually by each first valve assembly 7, 7a for each wheel brake cylinder 4, 4a, the driving wheels can be put into a state that serves to drive the vehicle.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An anti-skid and traction control system for vehicles including driven wheels, each of the wheels of which is assigned a wheel brake cylinder, a multi-circuit master cylinder, a brake line which communicates between said multi-circuit master cylinder and each of said wheel brake cylinders, at least one pressure fluid container connected with said master cylinder, at least one first valve assembly assigned to one of the driven wheels and located in the brake line, control means for switching said valve assembly in an anti-skid and traction control situation to different switching positions for at least pressure buildup and pressure reduction at a wheel brake, a second valve assembly, associated with at least one of the brake circuits, said second valve assembly located between said mutli-circuit master cylinder and said first valve assembly, said second valve assembly controls a brake fluid communication between said multi-circuit master cylinder and said first valve assembly in one of the brake circuits only in the traction control situation, at least one self-priming pump, said pump includes an inlet side and an outlet side, said inlet side upon pressure reduction is connectable by said first valve assemblies to the wheel brake cylinders, and by means of which pump, pressure fluid can be pumped from the outlet side into the brake line between the first and second valve assembly, a third valve assembly secured in said brake line between said pressure fluid container and said first valve assemblies, said third valve assembly existing between the pressure fluid container and the first valve assemblies of one brake circuit is openable and closable and the inlet side of the at least one self-priming pump also communicates with the third valve assembly via a line segment (13), which is open in the traction control situation, a first pressure-controlled valve (33) which opens in the direction of the pressure fluid container (1) is disposed in a return line (32) originating at said second valve assembly (5) and communicates with the pressure fluid container (1), said second valve assembly (5) in the anti-skid control situation shuts off the return line (32) toward the brake line (3) and in the traction control situation opens the return line (32) toward the brake line (3) between the second valve assembly (5) and the first valve assemblies (7, 7a).

2. An anti-skid and traction control system as defined by claim 1, which includes a second pressure-controlled valve (40) disposed in the return line (32) downstream of the first pressure-controlled valve (33) that opens in a direction of the pressure fluid container (1), said second pressure-controlled valve (40) opens at a substantially lower pressure than the first pressure-controlled valve (33).

3. An anti-skid and traction control system as defined by claim 1, in that an intermediate container (44) is disposed in the return line (32) downstream of the first pressure-controlled valve (33), said intermediate container (44) includes at least two chambers (45, 46), said return line (32) discharges via at least one inlet fitting (42) into at least one first chamber (45) of the intermediate container (44), at least one first chamber (45) which communicates hydraulically with at least one second chamber (46) and from whence a first fitting (49) leads to the pressure fluid container (1) and a second fitting (50) leads to the third valve assembly (12).

4. An anti-skid and traction control system as defined by claim 1, which includes a control line (11) that branches off from the brake line (3) between the multi-circuit master cylinder (2) and the second valve assembly (5) leads to the third valve assembly (12), and the third valve assembly (12) is adjustable in the braking situation and anti-skid control situation above a predetermined control pressure in the control line (11) into a closing position (17).

5. An anti-skid and traction control system as defined by claim 1, which includes a first fluid receiving chamber (35) that communicates with an existing brake line connection (18) between the first valve assemblies (7, 7a) and the third valve assembly (12).

6. An anti-skid and traction control system as defined by claim 1, which includes a second fluid receiving chamber (36) that communicates with an outlet of said pump and brake line (3) between the first valve assemblies (7, 7a) and the second valve assembly (5) via a throttle valve (31).

7. An anti-skid and traction control system as defined by claim 1, in which said line segment (13) establishes a communication between the pressure fluid container (1) and the first valve assemblies (7, 7a) and has a feed point (18), with which line segments (37, 37a) leading to the first valve assemblies (7, 7a) and one line segment (30) leading to the inlet side (20) of the pump (21) communicate.

8. An anti-skid and traction control system as defined by claim 1, which includes a filter (62) disposed in a line segment (19) between the pressure fluid container (1) and the third valve assembly (12), and the return line (32) discharges into the line segment (19) between the filter (62) and the pressure fluid container (1).

9. An anti-skid and traction control system as defined by claim 1, in which the self-priming pump (21) comprises a first pump element (53) and a second pump element (54), and the inlet side of the pump (21) is embodied by a first inlet (57), associated with the first pump element (53), and a second inlet (58), associated with the second pump element (54), and an outlet (56) of the first pump element (53) communicates with the inlet (58) of the second pump element (54).

10. An anti-skid and traction control system as defined by claim 9, in which the outlet (56) of the first pump element (53) and the inlet (58) of the second pump element (54) communicate with a third fluid receiving chamber (55), with which the first valve assemblies (7, 7a) likewise communicate.

11. An anti-skid and traction control system for vehicles, each of the wheels of which is assigned a wheel brake cylinder that communicates via a brake line with a multi-circuit master cylinder and at least one pressure fluid container, at least one first valve assembly assigned to one of the driven wheels and located in the brake line, said valve assembly, in the anti-skid and traction control situation, assumes switching positions for at least pressure buildup and pressure reduction at a wheel brake, a second valve assembly, associated with at least one of the brake circuits, located between the multi-circuit master cylinder and the first valve assembly, by means of said second valve assembly a communication between the multi-circuit master cylinder and the first valve assembly in one of the brake circuits is controllable only in the traction control situation, at least one self-priming pump having an inlet side and an outlet side, the inlet side of which, upon pressure reduction, is connectable by the first valve assemblies to the wheel brake cylinders, and by means of said pump, pressure fluid is pumped into the brake line between the first and second valve assembly, a third valve assembly assigned to at least one driven wheel by means of said third valve assembly, a communication existing between the pressure fluid container and the first valve assemblies of one brake circuit is openable and closable, and the inlet side of the at least one self-priming pump also communicates with the third valve assembly via a line segment (13), which is open in the traction control situation, a return line (32) which bypasses the second valve assembly is provided with a first pressure-controlled valve (33) opening toward the multi-circuit master cylinder (2), which valve (33) leads to the brake line (3) between the second valve assembly (5) and the multi-circuit master cylinder (2), said second valve assembly (5) in the anti-skid control situation effects a shutoff of the return line (32) toward the brake line (3) and in the traction control situation effects an opening of the return line (32) toward the brake line (3) between the second valve assembly (5) and the first valve assemblies (7, 7a).

12. An anti-skid and traction control system as defined by claim 11, which includes a control line (11) that branches off from the brake line (3) between the multi-circuit master cylinder (2) and the second valve assembly (5) and which leads to the third valve assembly (12), and the third valve assembly (12) is adjustable in the braking situation and anti-skid control situation above a predetermined control pressure in the control line (11) into a closing position (17).

13. An anti-skid and traction control system as defined by claim 11, which includes first receiving chamber (35) that communicates with an existing brake line connection between the first valve assemblies (7, 7a) and the third valve assembly (12).

14. An anti-skid and traction control system as defined by claim 11, in which said line segment (13) establishes a communication between the pressure fluid container (1) and the first valve assemblies (7, 7a) and has a feed point (18), with which line segments (37, 37a) leading to the first valve assemblies (7, 7a) and one line segment (30) leading to the inlet side (20) of the pump (21) communicate.

15. An anti-skid and traction control system as defined by claim 11, in which the self-priming pump (21) comprises a first pump element (53) and a second pump element (54), and the inlet side of the pump (21) is embodied by a first inlet (57), associated with the first pump elemtn (53), and a second inlet (58), associated with the second pump element (54 and an outelt (56) of the first pump element (53) communicates with the inlet (58) of the second pump element (54).

16. An anti-skid and traction control system as defined by claim 15, in which the outlet (56) of the first pump element (53) and the inlet (58) of the second pump element (54) communicate with a third fluid receiving chamber (55), with which the first valve assemblies (7, 7a) likewise communicate.

17. An anti-skid and traction control system as defined by claim 11, in which the return line originates at a second valve assembly (5) embodied as a 3/2-way magnetic valve.

18. An anti-skid and traction control system as defined by claim 11, in which a feed point (64) from which the return line (32) branches off is disposed in a connection existing between the outlet side (22) of the pump (21) and the second valve assembly (5).

19. An anti-skid and traction control system as defined by claim 18, in which the second valve assembly (5) comprises a 2/2-way magnetic valve.

20. An anti-skid and traction control system for vehicles, each of the wheels of which is assigned a wheel brake cylinder that communicates via a brake line with a multi-circuit master cylinder and at least one pressure fluid container, at least one first valve assembly assigned to one of the driven wheels and located in the brake line, said valve assembly in an anti-skid and traction control situation, is capable of assuming switching positions for at least pressure buildup and pressure reduction at a wheel brake, a second valve assembly associated with at least one of the brake circuits and located between the multi-circuit master cylinder and the first valve assembly, by means of said second valve assembly a communication between the multi-circuit master cylinder and the first valve assembly in one of the brake circuits is controllable only in the traction control situation, at least one self-priming pump having an inlet side and an outlet side, the inlet side upon pressure reduction is connectable by the first valve assemblies to the wheel brake cylinders, and by means of said pump, pressure fluid can be pumped into the brake line between the first and second valve assembly, said self-priming pump (21) is connected with a first inlet (57) of a first pump element (53) to a supplementary pressure fluid container (66) and via a further line (82) and a check valve (67) opens in the direction of the first inlet (57) to the second valve assembly (5), and in the traction control situation a fourth valve assembly (65) controls the communication of an outlet (56) of the first pump element (53) with an inlet (58) of a second pump element (54) of the pump (21), wherein in a position (29) of the second valve assembly (5) shutting off the brake line (3) between the multi-circuit master cylinder (2) and the first valve assemblies (7, 7a), the brake line (3) between the further valve assembly (5) and the first valve assemblies (7, 7a) can be made to communicate with the further line (82).

21. An anti-skid and traction control system as defined by claim 20, in which a check valve (69) disposed in the connection between the outlet (56) of the first pump element (53) and the inlet (58) of the second pump element (54) of the pump (21) opens in the direction of the second pump element (54).

22. An anti-skid and traction control system as defined by claim 21, in which the fourth valve assembly (70), in the traction control situation, severs the connection between the outlet (56) and the inlet (57) of the first pump element (53) and switches the outlet (56), via a check valve (69), into a connection with the inlet (58) of the second pump element (54).

23. An anti-skid and traction control system as defined by claim 20, in which the fourth valve assembly (65, 70), in the braking situation and in the anti-skid control situation, establishes a connection between the outlet (56) and the inlet (57) of the first pump element (53).

24. An anti-skid and traction control system as defined by claim 23, in which a control line (68) connected to the brake line (3) between the multi-circuit master cylinder (2) and the second valve assembly (5) leads to the fourth valve assembly (65), and actuates the fourth valve assembly (65), above a predetermined control pressure, into a position in which said fourth valve assembly establishes a connection between the outlet (56) and the inlet (57) of the first pump element (53).

25. An anti-skid and traction control system for vehicles, each of the wheels of which is assigned a wheel brake cylinder that communicates via a brake line with a multi-circuit master cylinder and at least one pressure fluid container, at least one first valve assembly assigned to one of the driven wheels and located in the brake line, said at least one valve assembly in the anti-skid and traction control situation, is capable of assuming switching positions for at least pressure buildup and pressure reduction at a wheel brake, a second valve assembly associated with at least one of the brake circuits and located between the multi-circuit master cylinder and the first valve assembly, by means of said second valve assembly a communication between the multi-circuit master cylinder and the first valve assembly in one of the brake circuits is controllable only in the traction control situation, at least one self-priming pump having an inlet side and an outlet side, said inlet side upon pressure reduction is connectable by the first valve assemblies to the wheel brake cylinders, and by means of said pump, pressure fluid is pumped into the brake line between the first and second valve assembly, a supplementary feed pump (72) having an inlet (73) and an outlet (74), said supplementary feed pump is connected with its inlet (73) to the pressure fluid container (1, 66) and its outlet (74) is connectable to a connection with the first valve assemblies (7, 7a), and that a first pressure-controlled valve (33) opening in the direction of the pressure fluid container (1, 66) is disposed in a return line (32) originating at the second valve assembly (5) and communicating with the pressure fluid container (1, 66), wherein the second valve assembly (5), in an anti-skid situation, effects a shutoff of the return line (32) toward the brake line (3) and in the traction control situation effects an opening of the return line (32) toward the brake line (3) between the second valve assembly (5) and the first valve assemblies (7, 7a).

26. An anti-skid and traction control system as defined by claim 25, in which the outlet (74) of the supplementary feed pump (72) communicates through a line (13) with the inlet of the self-priming pump, and a check valve (76) opening in the direction of the self-priming pump is disposed in the line (13).

27. An anti-skid and traction control system as defined by claim 25, in which the return line (32) leads downstream into a line segment (77) between the inlet (73) of the supplementary feed pump (72) and the pressure fluid container (1, 66).

28. An anti-skid and traction control system as defined by claim 25, in which the outlet (74) of the supplementary feed pump (72) is connected to the return line (32) between the second valve assembly (5) and the first pressure-controlled valve (33).

29. An anti-skid and traction control system as defined by claim 28, which includes two pressure fluid containers (1, 66) one of said pressure fluid containers serves as the pressure fluid container (1) of the multi-circuit master cylinder (2) and the other pressure fluid container serves as a supplementary pressure fluid container (66), with which the inlet (73) of the supplementary feed pump (72) communicates.

30. An anti-skid and traction control system as defined by claim 25, which includes two pressure fluid containers (1, 66) one of said pressure fluid containers serves as the pressure fluid container (1) of the multi-circuit master cylinder (2) and the other pressure fluid container serves as a supplementary pressure fluid container (66), with which the inlet (73) of the supplementary feed pump (72) communicates.

* * * * *